United States Patent [19]
Poon et al.

[11] Patent Number: 5,792,062
[45] Date of Patent: Aug. 11, 1998

[54] METHOD AND APPARATUS FOR DETECTING NONLINEARITY IN AN ELECTROCARDIOGRAPHIC SIGNAL

[75] Inventors: Chi-Sang Poon, Lexington; Mauricio Barahona, Cambridge; Christopher K. Merrill, Boston, all of Mass.

[73] Assignee: Massachusetts Institute of Technology, Cambridge, Mass.

[21] Appl. No.: 645,793

[22] Filed: May 14, 1996

[51] Int. Cl.$^6$ ............................................. A61N 5/0452
[52] U.S. Cl. ............................................. 600/509
[58] Field of Search ........................... 128/696, 705, 128/706

[56] References Cited

U.S. PATENT DOCUMENTS

| | | | |
|---|---|---|---|
| 5,201,321 | 4/1993 | Fulton | 128/702 |
| 5,321,409 | 6/1994 | Walker | 342/202 |
| 5,342,401 | 8/1994 | Spano et al. | 607/5 |
| 5,404,298 | 4/1995 | Wang et al. | 364/152 |
| 5,421,576 | 6/1995 | Yamazaki et al. | 273/138 A |
| 5,439,004 | 8/1995 | Duong-Van et al. | 128/705 |

FOREIGN PATENT DOCUMENTS

WO 9213273  8/1992  WIPO.

OTHER PUBLICATIONS

MacDonald, J.R. et al: "Discrimination between equations of state", Journal of Research of the National Bureau of Standards, Section a (Physics and Chemistry), Sep.–Oct. 1971, USA, vol. 75A, No. 5, ISSN 0022–4332, pp. 441–453.

Melbin, J: "On a non linear describing function for bio–data", Medical Research Engineering, USA, vol. 12, No. 3, ISSN 0025–7508, pp. 23–29.

De Maine P A D et al: "A non–statistical program for automatic curve–fitting to linear and non–linear equations", Management Informatics, Oct. 1974, Netherlands, vol. 3, No. 5, ISSN 0300–1636, pp. 233–250.

Rovati G E: "A versatile implementation of the Gauss–Newton minimization algorithm using MATLAB for Macintosh microcomputers" Computer Methods and Programs in Biomedicine, Jun. 1990, Netherlands, vol. 32, No. 2, ISSN 0169–2607, pp. 161–167.

"A Tutorial on Chaos in Control Theory", Thomas J. Taylor, IEEE (2102), 1992, pp. 2102–2106.

"Controlling Chaotic Continuous–Time Systems via Feedback", Dong et al., IEEE (2502), 1992, pp. 2502 and one unnumbered page.

"The Identification of Nonlinear Biological Systems: Volterra Kernel Approaches", Korenberg et al., Annals of Biomedical Engineering, vol. 24, 1996, pp. 250–268.

Chapter 10 "Nonlinear Systems Identification", ©Copyright 1996 by C.S. Poon, pp. 1–13 including two unnumbered pages.

Primary Examiner—William E. Kamm
Attorney, Agent, or Firm—Christopher S. Daly, Esq.; Nutter, McClennen & Fish, LLP

[57] ABSTRACT

A method and apparatus for detecting the presence of a nonlinear characteristic in a data sequence is provided.

26 Claims, 12 Drawing Sheets

METHOD AND APPARATUS FOR DETECTING NONLINEARITY IN AN ELECTROCARDIOGRAPHIC SIGNAL

This invention was made with government support under grant numbers N00014-95-0414 awarded by the Department of the Navy, NIH-5R03-HL50614 awarded by the National Institute of Health and BES-9216419 awarded by the National Science Foundation. The government has certain rights in the invention.

FIELD OF THE INVENTION

The present invention relates to dynamical systems and more particularly to methods and apparatus for detecting nonlinearity in dynamical systems.

BACKGROUND OF THE INVENTION

As is known in the art, a dynamical system is a system having output values which vary with respect to time. The time-changing output values at one time are interrelated with those at other times.

A linear dynamical system is a system in which a relatively small change in an initial condition of the system produces a relatively small and quantifiable or predictable change in an output state of the system. A nonlinear dynamical system, on the other hand, exhibits a relatively sensitive dependence on system initial conditions. Thus, a relatively small or even a virtually unmeasurable difference in system initial conditions can result in nonpredictable system output states. Such output states may in some instances have relatively large differences between them despite the relatively small differences in initial conditions of the system.

This causes the output states of some dynamical systems to appear to be random in nature. Many activities which appear to be random in nature are actually examples of a deterministic phenomenon referred to as chaos. The phenomena that have been shown to exhibit chaos include but are not limited to the transition from fluid flow to turbulent flow in fluids, many types of mechanical vibrations, irregular oscillations, chemical reactions, a rise and fall of epidemics, the irregular dripping of a faucet, and the behavior of biological systems including human cardiac systems. Generally, chaotic systems are relatively sensitive to perturbations of their initial condition.

Typically, systems exhibiting a chaotic behavior are analyzed by developing a model of the system sufficiently detailed to identify one or more key parameters of the system. One problem with this approach, however, is that this technique is typically useful in systems for which a theoretical model is known and which do not display irreversible parametric changes. Such parametric changes, however, may sometimes themselves be the very changes causing the chaos.

It has been recognized that electrical signals produced by a human heart reflects the activity of a nonlinear dynamical system which may be described using chaos theory. Thus, the human heart may be referred to as nonlinear dynamical or chaotic system. Dynamical systems such as the heart can exhibit both periodic and chaotic behavior depending upon certain system parameters. These parameters appear as constants in mathematical equations describing the system. The chaotic behavior exhibited by the heart, however, is not immediately obvious when looking, for example, at an electrocardiograph (ECG) signal.

One way to observe the chaotic behavior of the heart has been to plot the interbeat spacing or its reciprical (i.e heart rate) at a time n against the interbeat spacing (or heart rate) at time n+1. Such a plot is referred to as a Poincaré map or a return map. One problem with this technique, however, is that a relatively large amount of data is required to provide an accurate representation of the system. Furthermore, problems arise in collecting large amounts of data from biosystems. For example collection of a relatively large amount of bioelectric data on a human heart requires a human to wear a monitor or sensor for a relatively long period of time. Similarly, collection of a large number of human fluid samples requires a human to be struck with a syringe or other fluid drawing device. Moreover, relatively large processing power is required to analyze the large amount of data retrieved from the human subject or other biosystem. The need to process such large amounts of data makes it relatively difficult to provide a real time processing system. Furthermore, a relatively large amount of storage capacity is required to store the large amount of collected data.

It would, therefore, be desirable to provide a technique which can be used to detect the presence of nonlinearity in a dynamical system. It would also be desirable to determine whether nonlinear dynamical systems are chaotic systems. It would further be desirable to provide a technique for diagnosing disease in biosystems by detecting the presence of chaos in a biosignal (e.g. based upon their nonlinear or chaotic behavior). For example, it would be desirable to diagnose heart disease or heart failure by detecting the presence of chaos in an ECG signal.

SUMMARY OF THE INVENTION

In accordance with the present invention, a method for detecting nonlinearity in a dynamical system includes the steps of representing a data set from the dynamical system with both a first linear model and a first nonlinear model, comparing a performance measure of the first linear model to a performance measure of the first nonlinear model and identifying which of the two performance measures is a preferred performance measure. With this particular arrangement a method for identifying nonlinearity in a data series generated by a dynamical system is provided. The data series may be provided as a relatively short data series from either continuous parameter or discrete data signals which are contaminated with additive and or dynamic white noise, correlated noise or Poisson noise. Furthermore, the technique of the present invention may be used to identify nonlinearity in data sets having a relatively strong periodic characteristic.

In accordance with a further aspect of the present invention, a signal processing system includes a modeling system for providing a linear and a nonlinear model from a data set and an a performance measurement system for comparing the linear model to the nonlinear model and identifying the data as either containing or not containing a nonlinear component. With this particular arrangement a signal processing system for identifying nonlinearity in a dynamical system is provided. The signal processing system may be used, for example, to detect the presence of a chaotic signal component in a data sequence generated from an ECG signal. The modeling system includes a modeling processor for representing at least a portion of the signal with a first model corresponding to a first linear model and a second model corresponding to a first nonlinear model. The modeling system further includes a performance processor for computing a first performance measure of the first model and for computing a second performance measure of the second model. The performance measures are provided to the performance measuring system. In one embodiment, the performance measuring system includes a comparison processor for comparing the first performance measure to the second performance measure and a selection processor for identifying which of the first and second performance measures is a preferred performance measure. Upon identification of which of the first and second performance measures is a preferred performance measure, the selection processor provides an output signal indicating whether the bio-signal includes a nonlinear signal component. In one particular embodiment, the data sequence corresponds to a series of RR interval values.

In accordance with the present invention, a method and apparatus for detecting nonlinear determinism in a time series and for discriminating deterministic chaos from random variability is provided. Based upon the concept of embedding space, the technique of the present invention provides highly sensitive statistical detection of nonlinearity by comparing a prediction power of linear and nonlinear models of the Volterra-Wiener form which are generated recursively from an entire data series in a global manner. The technique of the present invention may be applied to relatively short data series, both continuous or discrete in nature, even when heavily contaminated with additive and/or dynamic white or correlated noise, with Poisson noise, or in the presence of strong periodicity.

BRIEF DESCRIPTION OF THE DRAWINGS

The foregoing features of the invention, as well as the invention itself may be more fully understood from the following detailed description of the drawings, in which.

DESCRIPTION OF PREFERRED EMBODIMENT

Figure 1:
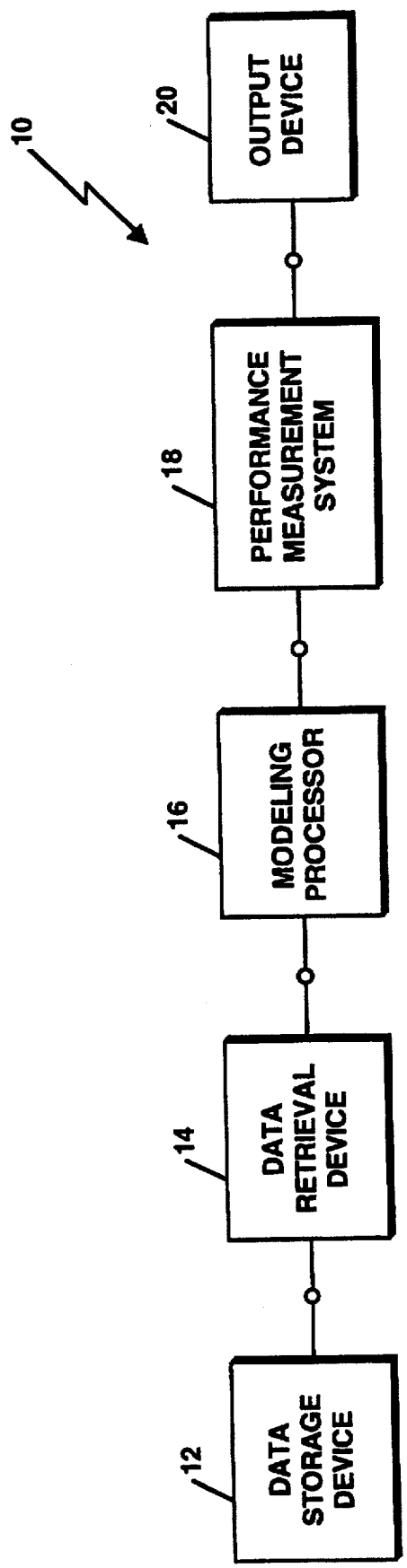
FIG. 1 is a block diagram of signal processing system for detecting nonlinearity in a signal.

Referring now to FIG. 1, a signal processing system 10 includes a data storage device 12 having stored therein data from a dynamical system to be modeled. The stored data may correspond to analog data or digital data. The data stored in data storage device 12 may correspond, for example to a sequence of output states or values $y_n$ (where n=1 ... N) of a dynamical system. As mentioned above, the output states of a dynamical system vary as a function of time. Such a sequence of output values $y_n$ are typically measured or observed by an appropriate sensor or measurement device and may be referred to as time series values. The output sequence $y_n$ is thus collected and stored as a data sequence in the storage device 12.

Typically the time series values are converted to discrete output values and stored in storage device 12 as sequence of digital data values. It should be noted, however, that in some applications it may be desirable to store the time series values as analog or continuous parameter values and later sample the stored continuous parameter signal to provide discrete data samples. Thus data storage device may be provided, for example, as a compact disk read only memory (CD ROM), a random access memory (RAM), a magnetic tape, a hard drive, a mass storage system or the like.

The data storage device 12 has coupled thereto a data retrieval device 14 which retrieves data from the data storage device 12 and provides the data to a modeling system 16. Modeling system 16 generates a mathematical representation of the system which generates the data stored in storage device 12. The process of obtaining such a mathematical representation is typically referred to as modeling and the final mathematical representation is referred to as a model. The model is then used to predict future time series values from measured or detected time series values.

Modeling system 16 uses the data retrieved by data retrieval device 14 to generate a plurality of linear models and a plurality of nonlinear models. Each of the linear and nonlinear models thus represent the system which generated the data stored in data storage device 12 and may be used to predict the value of future data point in the time series. The particular form of the models will be described in detail below. Suffice it here to say, however, that any type of model capable of adequately representing a particular type of dynamical system may be used.

It should be noted that in accordance with conventional mathematical definitions every type of model may be classified as either a linear model or a nonlinear model. It is recognized, however, that in practice some models may be described as weakly nonlinear or strongly nonlinear. A weakly nonlinear model is a model having a nonlinear component which contributes relatively little to the model (i.e. a so-called weak nonlinear component). Since the model includes a nonlinear component, the model thus meets the strict mathematical definition of a nonlinear model. A weakly nonlinear model, however, includes a linear component which dominates the characteristic of the model causing the model to behave as a linear model. For the purposes of the present application, a weakly nonlinear model will thus be referred to simply as a linear model.

A strongly nonlinear model includes at least one nonlinear component and thus also meets the strict mathematical definition of a nonlinear model. The nonlinear component of a strongly nonlinear model, however, dominates the characteristic of the model causing the model to behave as a nonlinear model. For the purposes of the present application, a strongly nonlinear model will thus be referred to simply as a nonlinear model.

The linear and nonlinear models are both fed to a performance measure system 18 which compares a performance measure of at least one linear model with a performance measure of at least one nonlinear model. From the results of this comparison, the performance measure system 18 determines whether the data set retrieved by the data retrieval device 14 is best represented by the linear model or the nonlinear model.

If performance measure system 18 determines that the data set does not include a nonlinear signal component, and thus is best represented by the linear model, then the data set was generated by a linear dynamical system. If, on the other hand, performance measure system 18 determines that the data set includes a nonlinear signal component, and thus is best represented by the nonlinear model, then the data set was generated by a nonlinear dynamical system. Furthermore, as will be described in detail below in conjunction with FIGS. 2-2B, performance measure system 18 can determine if the nonlinear signal component is a chaotic signal component. The performance measure system 18 provides an output signal to an output device 20 which provides an indication of whether the data set includes a nonlinear component.

Typically, a dynamical system can be described as a black box having an input sequence $X_n$ and an output sequence $y_n$ at time n=1, . . . , N in multiples of the sampling time T. In accordance with the present invention, a closed-loop version of the Volterra series in which the output $y_n$ loops back as a delayed input (i.e. $x_n \equiv y_{n-1}$) may be used to represent the dynamical system including those dynamical systems provided as strictly autonomous dynamical systems or dynamical systems which have been reformulated as such. Within this framework, a univariate time series may be analyzed by using a discrete Volterra-Wiener-Korenberg series of degree d and memory k as a model to calculate a predicted time series $y_n^{calc}$ as shown in Equation (1) below:

$$y_n^{calc} = a_0 + a_1 y_{n-1} + a_2 y_{n-2} + \ldots + a_k y_{n-k} + \quad \text{Equation (1)}$$

$$a_{k+1} y_{n-1}^2 + a_{k+2} y_{n-1} y_{n-2} + \ldots + a_{M-1} y_{n-k}^d = \sum_{m=0}^{M-1} a_m z_m(n)$$

in which:

a$_n$=coefficients of the polynomial for n=0 to N;

k=an embedding dimension;

d=the degree of the polynomial function (i.e. the degree of nonlinearity of the model);

M=a total dimension of the equation and may be computed as:

$$M=(k+d)!/(d!k!).$$

It should be noted that other forms of functional expansions are also possible. For example block-structured models may also be used. As can be seen from Equation (1) the set $\{z_m(n)\}$ represents a functional basis composed of all the distinct combinations of the embedding space coordinates $(y_{n-1}, y_{n-2}, \ldots, y_{n-k})$ up to degree d, having a total dimension M. Thus, each model is parameterized by the embedding dimension k and the degree of the nonlinearity of the model d.

A recursive procedure is preferably used to estimate the values of the coefficients $a_m$. In a preferred embodiment, a Gram-Schmidt procedure from linear and nonlinear autocorrelations of the original data series itself may be used to compute values for the coefficients $a_m$. Those of ordinary skill in the art will recognize of course that other recursive and nonrecursive techniques may also be used to compute values of the coefficient $a_m$. Such computations may be performed, for example, on a workstation.

Next, a performance measure is computed for each of the models. For example, a short-term prediction power E of a model may be measured by computing a one-step-ahead prediction error in accordance with Equation (2);

$$\epsilon(k,d)^2 \equiv \frac{\sum_{n=1}^{N} (y_n^{calc}(k,d) - y_n)^2}{\sum_{n=1}^{N} (y_n - y)^2} \quad \text{Equation (2)}$$

in which:

$\epsilon(k,d)^2$ is a value which corresponds to a normalized variance of the error residuals; and, y may be computed as:

$$y = 1/N \sum_{n=1}^{N} y_n$$

Once all of the models are computed or as the models are being computed, a search is performed to identify an optimum model $\{k_{opt}, d_{opt}\}$. The optimum model may be defined, for example, as the model which minimizes the following information criterion in accordance with the parsimony principle:

$$C(r)=\log \epsilon(r)+r/N$$

where:

r $\in$ [1, M] is the number of polynomial terms of the truncated Volterra expansions from a certain pair of embedding dimension values and degree of nonlinearity of the model (k,d).

Those of ordinary skill in the art will appreciate of course that other information criteria may also be used. The numerical procedure using the above information criteria is as follows: For each data series, identify the best linear model by searching for the linear model having an embedding dimension value $k^{lin}$ which minimizes the performance measure C(r). It should be noted that the linear models are those models in which the degree of the polynomial function is 1 (i.e. d=1).

Similarly, the nonlinear model having an embedding dimension value $k^{nl}$ which minimizes the performance measure C(r) is identified. It should be noted that the nonlinear models are those models in which the degree of the polynomial function is greater than 1 (i.e. d>1).

Next surrogate randomized data sets with the same autocorrelation (and power spectrum) as the original series are generated and optimum linear and nonlinear models are identified for the surrogate data sets. This results in four competing models having the following error standard deviations $$\epsilon_{orig}^{lin}, \epsilon_{orig}^{nl}, \epsilon_{surr}^{lin}, \epsilon_{surr}^{nl}$$

in which $\epsilon$ corresponds to the standard deviation;

the superscript lin denotes a linear model;

the superscript nl denotes a nonlinear model;

the subscript orig denotes an original data sequence; and the subscript surr denotes a surrogate data sequence.

From above, the presence of nonlinear determinism is indicated if the optimum model (i.e. the model which minimizes the information criterion given above) has a polynomial of degree greater than 1 (i.e.$d_{opt}$>1). Further corroboration may be obtained with the following objective statistical criteria: For models having gaussian residuals, a standard F-test will serve to reject, with a certain level of confidence, the hypothesis that nonlinear models are not better than linear models as one-step-ahead predictors. This gaussian assumption may be tested by using an $x^2$- test with a 99% cutoff.

Alternatively, the results may be confirmed using a non-parametric Mann-Whitney rank-sum statistic, which does not depend on a gaussian assumption. Under this scheme, the relevance of nonlinear predictors is established when the best nonlinear model from the original data is significantly more predictive than both (a) the best linear model from the data series, and (b) the best linear and nonlinear models obtained from the surrogate series. This may be expressed as:

$$\epsilon_{orig}^{lin} \cdot \epsilon_{surr}^{nl} \cdot \epsilon_{surr}^{lin} > \epsilon_{orig}^{nl}$$

were the comparisons are made in the statistical sense.

It should, however, be noted that since surrogate data are generated by preserving only the linear autocorrelation function of the data series (nonlinear autocorrelations are randomized), the addition of nonlinear terms does not increase the prediction power and the one step ahead prediction error for the nonlinear model using the surrogate data set is approximately equal to the one step ahead prediction error for the linear model using the surrogate data set. This may be express as:

$$\epsilon_{surr}^{nl} \approx \epsilon_{surr}^{lin}$$

Furthermore, surrogate data are always best approximated by a linear model.

Figure 5:
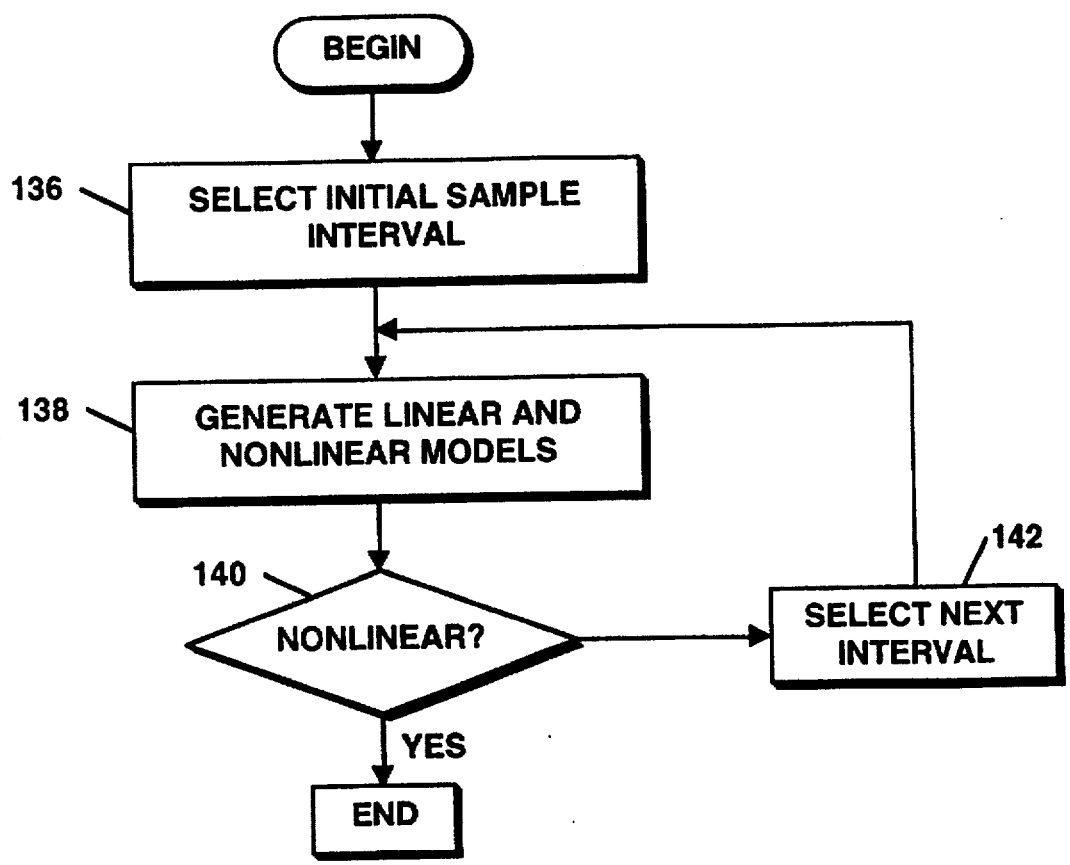
FIG. 5 is a flow diagram which illustrates the steps in selecting a sample interval.

It should also be noted that, when dealing with continuous signals, the time delay T for the embedding (or optimal sampling rate) is another free parameter to be determined. Selection of the time delay T will be described in detail below in conjunction with FIG. 5. Suffice it here to say that for detection purposes, an optimal time delay $T_{opt}$ may be selected to maximize the difference between the one step ahead prediction error for the nonlinear model using the original data set $\epsilon_{orig}^{lin}$ and the one step ahead prediction error for the nonlinear model using the original data set $\epsilon_{orig}^{nl}$ Furthermore, it should be noted that the value of optimum sampling interval $T_{opt}$ is bounded by two limits. On one hand, if the sampling interval is much greater than the optimum sample interval $T_{opt}$ (i.e. $T>>T_{opt}$) then the sequence is being undersampled and all four models (linear and nonlinear, original or surrogate) will have similarly small prediction powers and nonlinearity cannot be detected. On the other hand, for an over sampled data series having a relatively small step size (e.g. $T<<T_{opt}$), the linear correlation of the embedding is so large that linear models always prevail. That is, the linear model will always appear to best represent the data set. Within the range of acceptable time delays which includes $T_{opt}$, generally the standard deviation of the linear models for both the original and surrogate data sets are approximately equal $\epsilon_{orig}^{lin} \approx \epsilon_{surr}^{lin}$. That is, when optimally sampled, the prediction power of the linear model of a continuous signal derives mainly from its autocorrelation function. This equivalence of linear models from original and surrogate data holds for discrete maps as well. Consequently, and in contrast with other methods, surrogate data play only a confirmatory role (rather than a predicatory role) in the present technique.

The technique of the present invention can be used to detect nonlinearity in relatively short time series. For example nonlinearity may be detected in data sequences having as few as one thousand points or less.

The technique of the present invention was tested with several linear signals which, in some cases, proved to be non-recognizable by some conventional methods. The examples included: white gaussian and colored $1/f^\alpha$ noises;

an autoregressive linear random process; periodic-sinusoidal and nonsinusoidal- series; as well as a quasi periodic signal from a torus with two frequencies. In all cases the technique yielded $\epsilon_{lin} \leq \epsilon_{nl}$ and the linear hypothesis could not be rejected. The same conclusion was reached in the presence of noise or when an a posteriori nonlinear transformation was performed on original linear data.

Table I, below summarizes some of the results obtained using the technique of the present invention and the Volterra-Wiener-Korenberg algorithm for numerically generated nonlinear examples. Table I illustrates the maximum noise rejection obtained using the techniques of the present invention for a plurality of different dynamical systems.

TABLE I

| Discrete Systems | % Additive Noise | Continuous System | % Additive Noise |
|---|---|---|---|
| Logistic map | 70 | Rossler | 75 |
| Henon map | 70 | Duffing | 40 |
| Ikeda map | 65 | Lorenz II | 50 |
| Ecological model | 50 | Series D | 50 |
| Non chaotic fractal | 25 | Mackey-Glass | 15 |

It should be noted that Table I includes diverse data sets. For example, most of the discrete series (except the Henon and logistic maps) have non-polynomial, non-Volterra functional forms. The detection technique of the present invention worked equally well with continuous systems including those that evolve around several ghost centers such as Lorenz, Duffing;high dimensional systems; and chaotic series from nonlinear delayed feedback mechanisms (commonly referred to as the Mackey-Glass equation) with implicit high dimensionality.

It should also be noted that the technique of the present invention is effective in the presence of noise. The technique of the present invention may be used to detect nonlinearity even after the addition to each of the nonlinear examples white and/or colored measurement noises—the latter with the same autocorrelation as the original series (Table I). Thus, even with relatively short series, nonlinearity may be detected under relatively high levels of noise (~40–75%).

It should further be noted that although the choice of model selection criterion is not critical for the present purpose, the reliability of the resulting models as long-term predictors is dependent on the chosen criterion, the nature of the time series and the amount of noise present in the time series. It should also be noted that the technique of the present invention can be extended to non-polynomial functional bases or multivariate series. However, these approaches may not be feasible for large-scale functional expansions unless efficient techniques (such as the recursive technique described herein) become available.

Figure 1A:
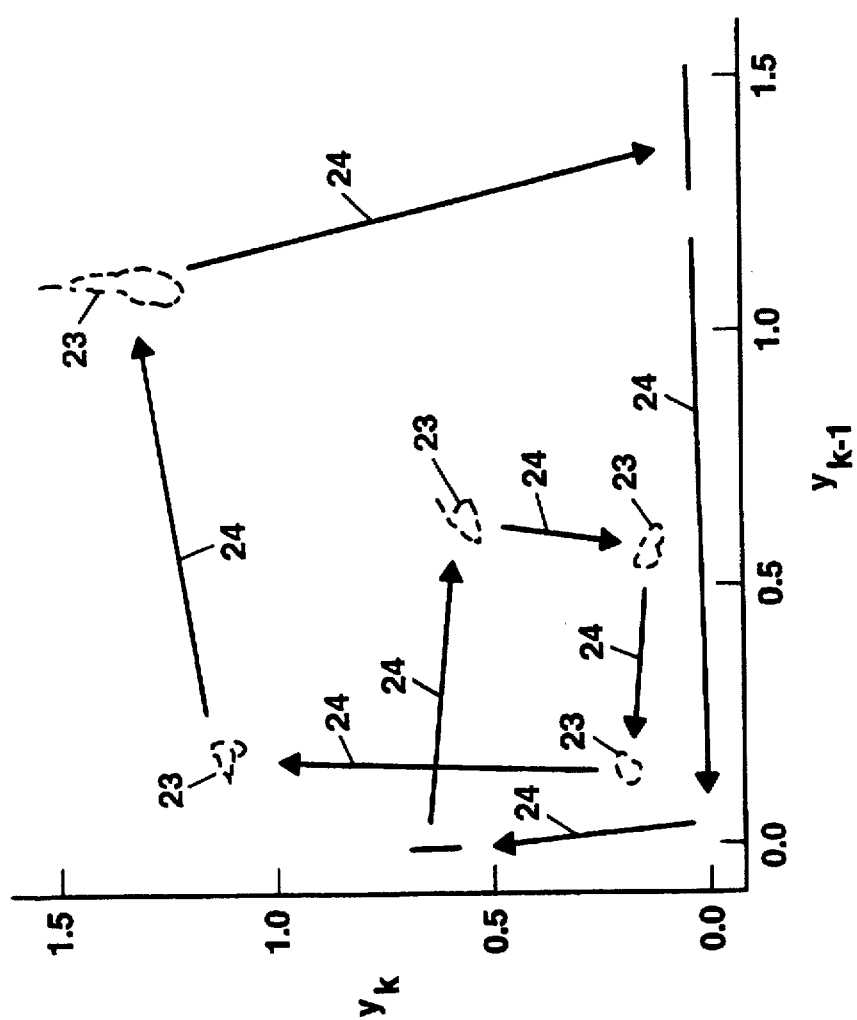
FIG. 1A is a plot of a sequence having a chaotic component.

Referring briefly to FIG. 1A, a plot of a trajectory of an attractor is shown. As can be seen, the trajectory includes fractals in several disconnected domains 23. As shown in the plot, the attractor moves to each of the domains 23 in a periodic manner as indicated by arrows 24. Thus, although the sequence is periodic, the values in each domain 23 are not identically the same each time the system enters the domain. This strong periodicity makes detection of the chaotic component difficult because the values of the sequence do not ever exactly repeat. The technique of the present invention, however, may be used to detect such chaotic components in periodic sequences.

Figure 2:
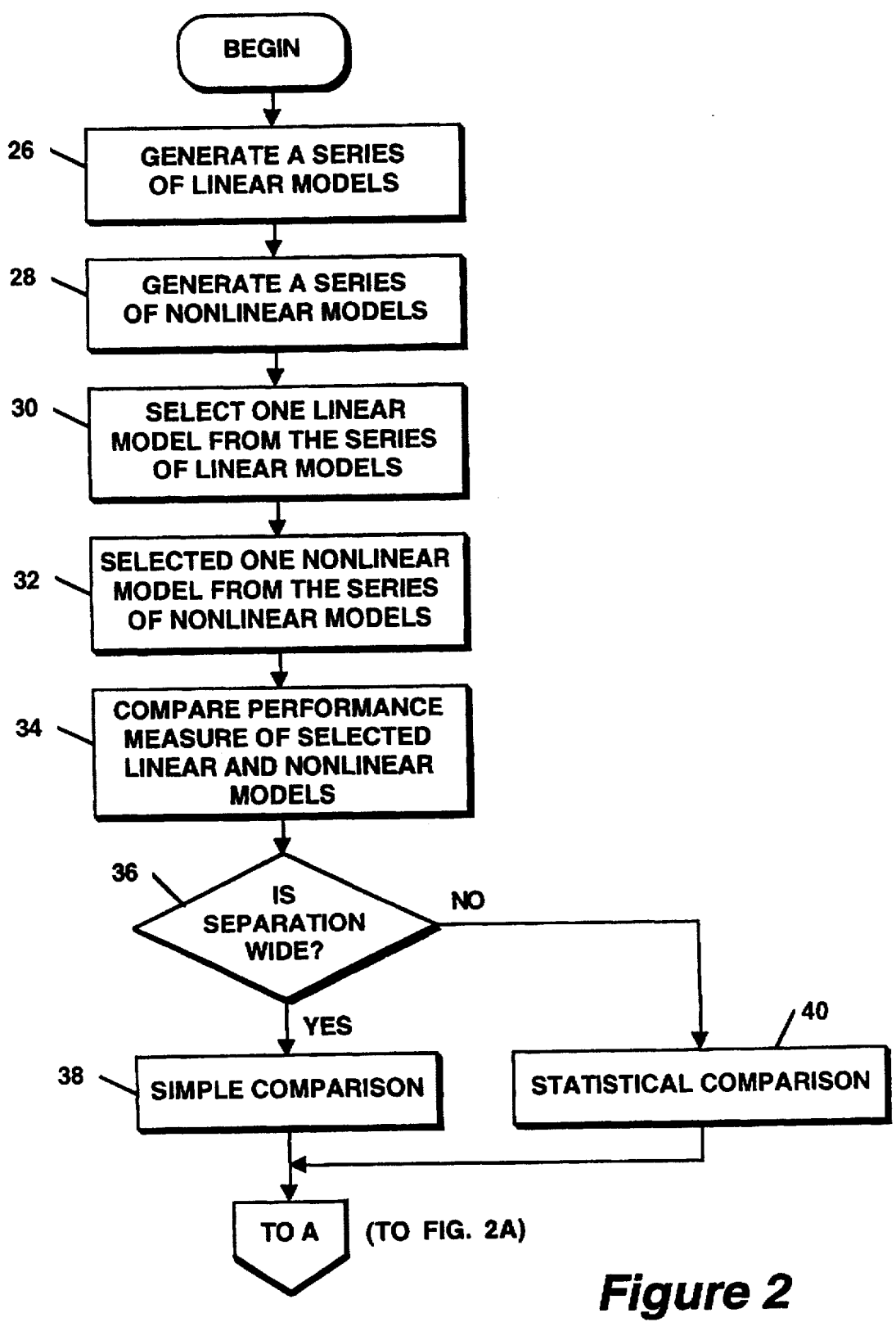
FIGS. 2–2A are a series of flow diagrams of the processing preformed by the system of FIG. 1 to determine whether a data set includes nonlinear components.
Figure 2A:
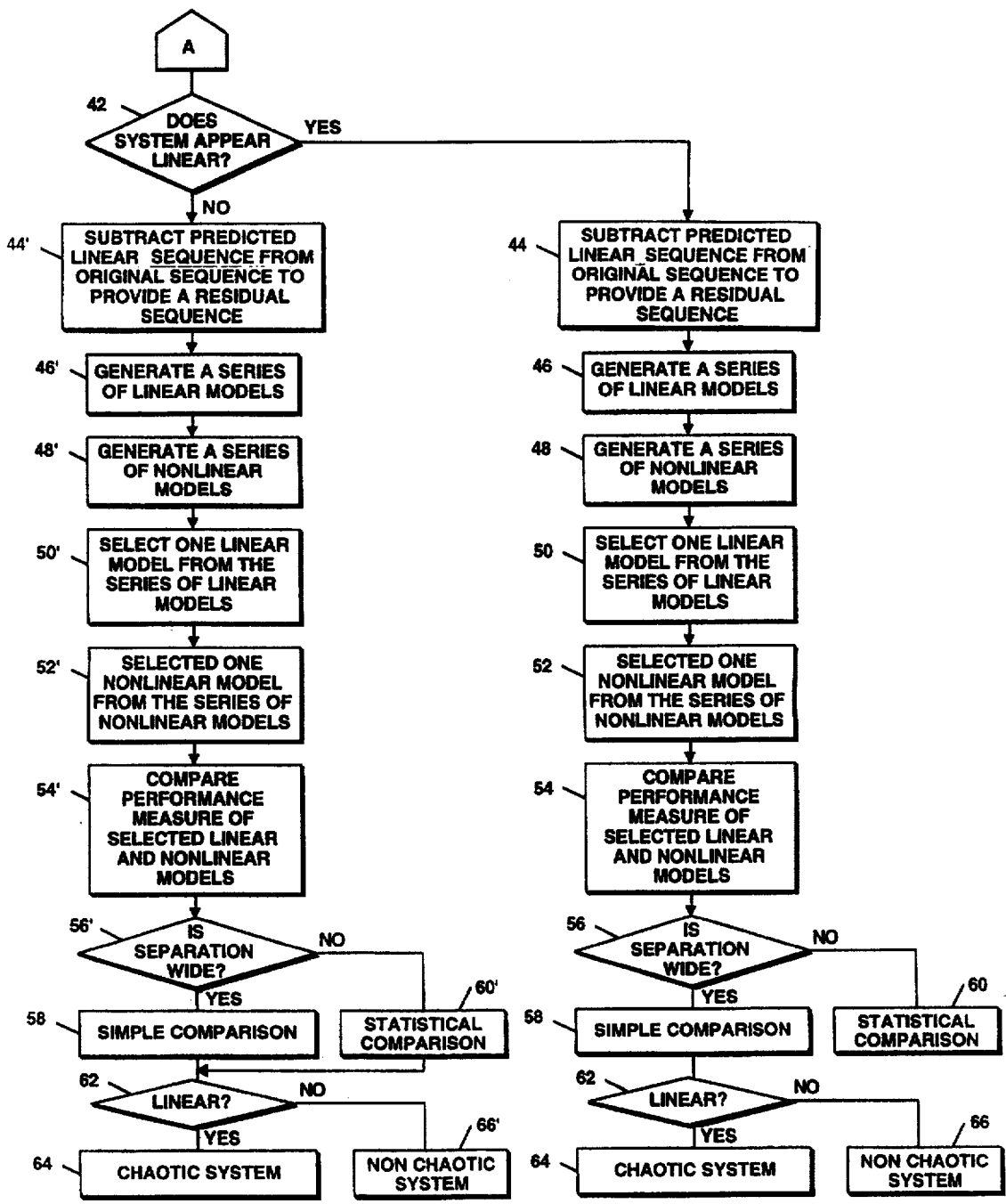

FIGS. 2 and 2A show a flow diagram of the processing performed by apparatus 10 to determine whether data stored on storage device 12 includes a nonlinear signal component.

The rectangular elements (typified by element 26), herein denoted "processing blocks," represent computer software instructions or groups of instructions. The diamond shaped elements (typified by element 36), herein denoted "decision blocks," represent computer software instructions, or groups of instructions which affect the execution of the computer software instructions represented by the processing blocks. The flow diagram does not depict syntax of any particular programming language. Rather, the flow diagram illustrates the functional information one skilled in the art requires to generate computer software to perform the processing required of apparatus 10. It should be noted that many routine program elements, such as initialization of loops and variables and the use of temporary variables are not shown.

Turning now to FIGS. 2 and 2A, as shown in steps 26, 28, a series of linear models and nonlinear models are obtained for a data sequence. The data sequence may be collected and stored in a storage device or alternatively the data sequence may be collected and the linear and nonlinear models may be generated in real-time. In one embodiment, the linear and nonlinear models may be provided as a closed-looped version of the Volterra-Wiener-Korenberg series discussed above in conjunction with FIG. 1, in which an output value $y_n$ loops back as a delayed input (i.e. $x_n=y_{n-1}$). Those of ordinary skill in the art will recognize of course that any technique may be used to provide the models. For example, the models may be provided using a so-called block-structured procedure, a Lee-Schetzen procedure, a least squares procedure or any other recursive procedure well known to those of ordinary skill in the art. The Volterra-Wiener-Korenberg series discussed above, however, provides a computationally efficient and statistically stable technique for modeling the data. Such a computationally efficient and statistically stable technique is desirable to use in systems in which it is desirable to process noise corrupted data in real time.

Next, as shown in step 30, a particular linear model is selected from the series of linear models generated in step 26. To select the linear model, a performance measure of each of the linear models is selected and computed. The performance measure of each of the linear models are compared to each other. The particular linear model which is selected is the linear model having a preferred performance measure. It should be noted that in some applications the preferred performance measure may be specifically selected by a user of the system and may not necessarily correspond to an optimum or best performance measure. The selected linear model has a preferred performance measure.

Similarly, as shown in step 32, a particular one of the nonlinear models is selected from the series of nonlinear models generated in step 28. To select the particular nonlinear model, a performance measure of the model is identified and this performance measure is computed for each of the nonlinear models in the series of nonlinear models. The computed performance measures are compared and the nonlinear model having a preferred performance measure is selected. It should be noted that in some applications, the preferred performance measure may not correspond to an optimum or best performance measure.

It should be noted that any one of a plurality of performance measures including but not limited to the Akaike Information Criteria (AIC), a minimum description length measure, a log likelihood measure and a residual sum of square errors may also be used. The selection of a particular performance measure depends upon a variety of factors including but not limited to the particular type of system being analyzed (e.g. biological system, economic system, social system, etc . . . ), the particular type of signal being analyzed and the type of noise present noted that in some applications it may be desirable to use more than one performance measure. For example multiple performance measures may be used to aid in the determination of whether a system is linear or nonlinear. In this case a plurality of different criteria (e.g. three criteria) may be monitored and if a majority of the plurality of the criteria (e.g. two out of the three criteria) indicate that the data is nonlinear then the decision is made that the data is nonlinear.

The performance measures of the selected linear and nonlinear models having the preferred performance measures are then compared as shown in step 34. Next, as shown in decision block 36, a decision is made as to whether the separation between the performance measures of the selected linear and nonlinear models is relatively wide.

Figure 2B:
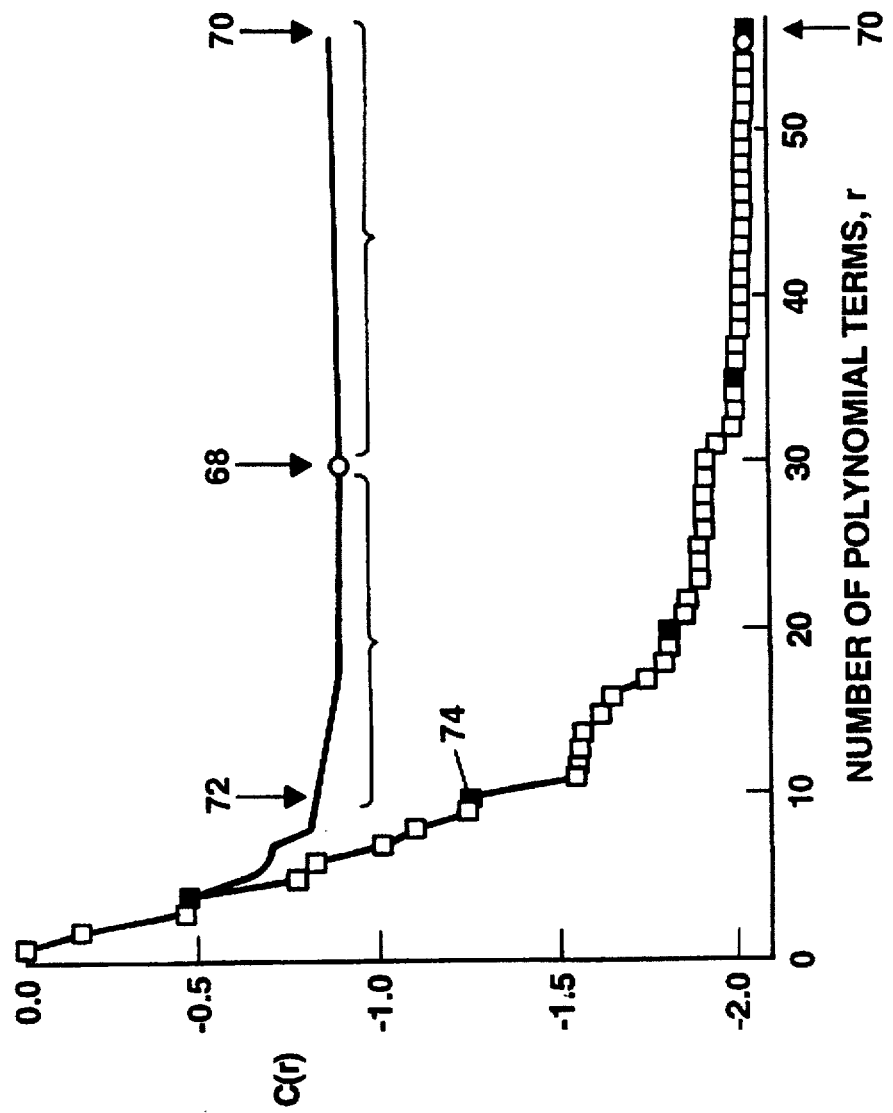
FIG. 2B is a plot of the Akaike information criterion versus the number of polynomial terms in a model.

For example, referring briefly to FIG. 2B, a plot of one type of performance measure versus the number of polynomial terms in a series of linear and nonlinear models is provided. In this particular example, the performance measure corresponds to the Akaike Information Criteria (AIC). Thus, the AIC of the linear model having the optimum AIC for that particular data set is compared to the AIC value of the nonlinear model having the optimum AIC for that particular data set.

As can be seen in the plot of FIG. 2B, the optimum AIC value of the linear model (indicated by arrow 68) occurs prior to reaching the maximum data points (indicated by arrow 70) available in the model. The optimum nonlinear model, however, corresponds to the maximum data point location of the model as indicated by reference designation 70. Thus, in this particular example, a relatively wide difference exists between the AIC value of the linear model and the AIC value of the optimum nonlinear model.

Accordingly, and referring again to FIG. 2, processing continues to step 38 where a comparison is performed between the preferred AIC value of the linear model and the preferred AIC value of the nonlinear model. Since in this case the two AIC values are separated by a relatively wide distance, a relatively simple comparison technique may be used to compare the two values. For example, the values may simply be compared to each other and the lowest AIC value selected.

It should be noted, however, that in cases where a relatively wide separation exists between performance measure values of a linear model and a nonlinear model, it may not be necessary to compute performance measure values for each of the models. For example, after computation of performance measure values at reference designations 72 and 74, a relatively wide separation between performance measure values exists. Thus, it may be desirable to stop computing performance measures for each of the models. Furthermore if the performance measures are being computed after each model is generated, then a determination of nonlinearity may be made after relatively few models have been generated thus increasing computational efficiency of the technique.

If the AIC values are not separated by a relatively wide margin, then it may be desirable to use a statistical approach as shown in step 40 to select between the preferred AIC value of the linear model and the preferred AIC value of the nonlinear model. In the case where the performance measure values are not separated by a relatively wide margin, it may be desirable for the preferred AIC values to correspond to the optimum AIC values for both the linear and nonlinear models.

Once the preferred AIC values are identified and compared, processing continues to decision block 42 where decision is made as to whether the system is linear. That is, if the linear model represents the system from which the data set is taken better than the nonlinear model, then the AIC value of the linear model will be lower than the AIC value of the nonlinear model. Thus, in this case, if the AIC value of the linear model is lower than the AIC value of the nonlinear model the system is identified as a linear system.

However, there are three possible states of a nonlinear system: (1) chaotic; (2) periodic; and (3) equilibrium. Thus, if in step 42 decision is made that the data is linear, there may still be a hidden nonlinear component, i.e. a nonlinear component which is being masked by a strong linear component caused for example, by soem baseline drift or periodic fluxuation in the signal. Thus it may be desirable to further process the data to determine whether a nonlinear component exists. If it is desirable to further process the data, then processing flows to steps 44-66 as shown.

It may be desirable to perform such processing since some signals can have both a chaotic component and a periodic or drift component. If the chaotic component is relatively or moderately strong compared with the periodic component, then the steps already taken will generally be sufficient to detect the nonlinear or chaotic component. If, however, the periodic component is very strong compared with the chaotic component, then it may be relatively difficult to detect the chaotic component. Thus, although the results of steps 28-42 may indicate that the system appears linear, processing in steps 44-60 enhances the detection of nonlinearity in a data set.

As shown in processing step 44, the predicted linear sequence is subtracted from the original sequence to produce a residual sequence. Then as shown in steps 46-60, linear and nonlinear models are generated, performance measures are computed and compared and processing flows to decision block 62 where a decision is then made as to whether the residual sequence is linear or not.

If the residual sequence is best represented as a linear model, then the system is identified as a linear system. If on the other hand the residual sequence is most accurately represented as a non linear model then the system is identified as a nonlinear system. The above technique may thus be used to differentiate between nonlinear periodic systems and nonlinear chaotic systems. Thus steps 44-60 are performed to aid in the detection of a hidden nonlinear component in a data set, i.e. a nonlinear component which is being masked by a strong linear component.

If on the other hand, as shown in FIG. 2B, the AIC value of the nonlinear model is lower than the AIC value of the linear model, then the system can be identified as a nonlinear system. Thus in step 42 decision is made that the system does not appear linear (i.e. it appears nonlinear). Although it has been found that when it is determined that the system is a nonlinear system it is often also a chaotic system, in some applications it may be desirable to further process the data as shown in steps 44'-66' which are substantially the same as steps 44-66. For example, a single system may exhibit both periodic and chaotic behavior. In accordance with the present technique the first analysis, as described in steps 26-40 above, determines that the system is nonlinear. It would be desirable, however, to perform steps 44'-66' to further insure that the nonlinear characteristic is in fact a chaotic characteristic rather than a periodic characteristic. Thus, to verify that the system is a nonlinear system which is chaotic, processing may optionally continue to processing step 44'-66' which are substantially the same as processing steps 44-66 discussed above. Thus, by subtracting the linear approximation of the periodic component from the original data set, it is possible to detect relatively small chaotic components which exists in a single system having both chaotic and periodic behavior.

Figure 3:
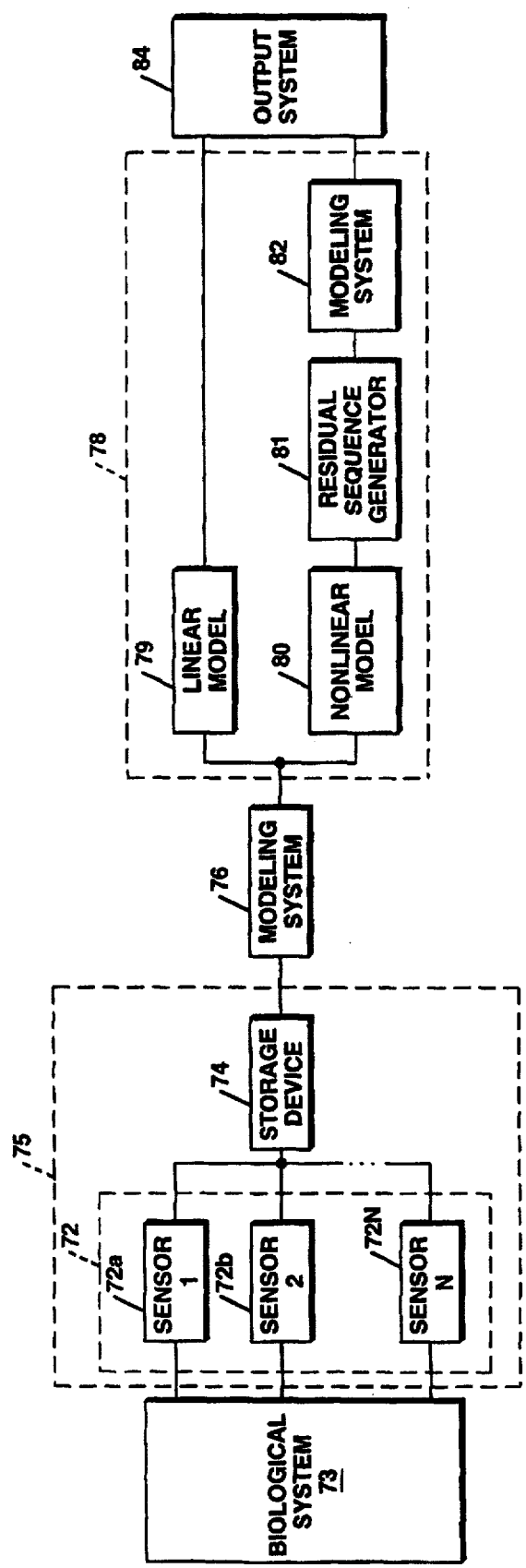
FIG. 3 is a block diagram of a biological diagnostic system.

Referring now to FIG. 3, a biological diagnostic system 70 includes a sensor system 72. In this particular embodiment, sensor system 72 is shown to include a plurality of sensor 72a-72N. Those of ordinary skill in the art will appreciate, of course, that sensor system 72 may include a single sensor. Each of the sensors 72a-72N are coupled to a biological system 73. Sensors 72a-72N are disposed to sense bioelectric, chemical, mechanical, electromagnetic, temperature and other characteristics of the biological system 73. Thus, sensors 72a-72N may correspond, for example, to electrocardiogram (ECG) electrodes, electroencephalograph (EEG) electrodes, blood or other fluid drawing devices, pressure sensors, motion sensors, vibration sensor or other mechanical motion sensors, electromagnetic sensors, and temperature sensors, etc.

Sensor system 72 could also include any data sampling devices such as analog to digital convertors or the like. Output signals from sensor 72 are fed to a storage device 74. Storage device 74 may be selected to store analog signals or digital signals. Storage device 74 is appropriately selected to receive and store output signals provided thereto from sensor 72. Thus, if sensor 72 provides a sequence of discrete data values as a stream of digital bits, then storage device 74 is provided as a digital data storage device such as a random access memory.

The data collected by sensor 72 is thus fed to storage device 74 and made available to a modeling system 76. Thus if biological system 73 is a human heart, for example, the sensors 72a-72N should preferably be provided as electrodes which detects the electrical activity of the heart. Thus in this case sensor 72 and storage device 74 may be provided, for example, as an electrocardiograph (ECG) monitor of the portable or stationary type.

Modeling system 76 receives the data from storage device 74 and generates a linear and nonlinear model of biological system 73 using the data fed thereto. The linear and nonlinear models are fed to a performance measurement system 78 which performs a comparison between the linear model and nonlinear models generated by modeling system 76. Such a comparsion may be performed, for example, by comparing a performance measure of the linear model with a performance measure of the nonlinear model. It may, in some applications, be desirable to select the linear models and nonlinear models as the optimum models. Based upon the results of the comparison, performance measurement system 78 provides an output signal indicating whether the biological system 73 is most accurately represented by a linear or a nonlinear model. If the system is most accuately detected by the nonlinear model, then this indicates that the system detected a nonlinear component in the data set.

Performance measurement system 78 may optionally include a residual sequence generator 81, a residual modeling system 82 and an output system 84 coupled as shown. If performance measurement system 78 determines that biological system 73 is most accurately represented by a linear model, then the residual sequence generator 81 subtracts the linear data sequence predicted by the linear model 80 from an original sequence stored in storage device 74 to produce a residual sequence.

Residual modeling system 82 then generates a series of linear models and nonlinear models to represent the residual data sequence. Residual modeling system 82 then performs a comparison between the linear and nonlinear models. Such comparison may be performed, for example, by comparing a performance measure of an optimum linear model of the residual sequence with a performance measure of an optimum nonlinear model of the residual data sequence. Based upon the results of the comparison, residual modeling system 82 determines if the residual data sequence is most accurately represented by the linear model or the nonlinear model.

If the residual sequence is most accurately represented by the linear model then modeling system 82 provides an output signal to output system 84 which indicates that the system is a linear system. If, on the other hand, modeling system 82 determines that the nonlinear model most accurately represents the residual data sequence, then modeling system 82 provides an output signal to output system 84 which indicates that the biological system is a nonlinear system.

As mentioned above, the techniques of the present invention may be applied to biological, physical, social, and economic systems such as the stock market (e.g. the Dow Jones index). One particular type of biological system which may be analyzed using the techniques of the present invention, for example, corresponds to a method of diagnosing heart disease from hemodynamic data.

Figure 4:
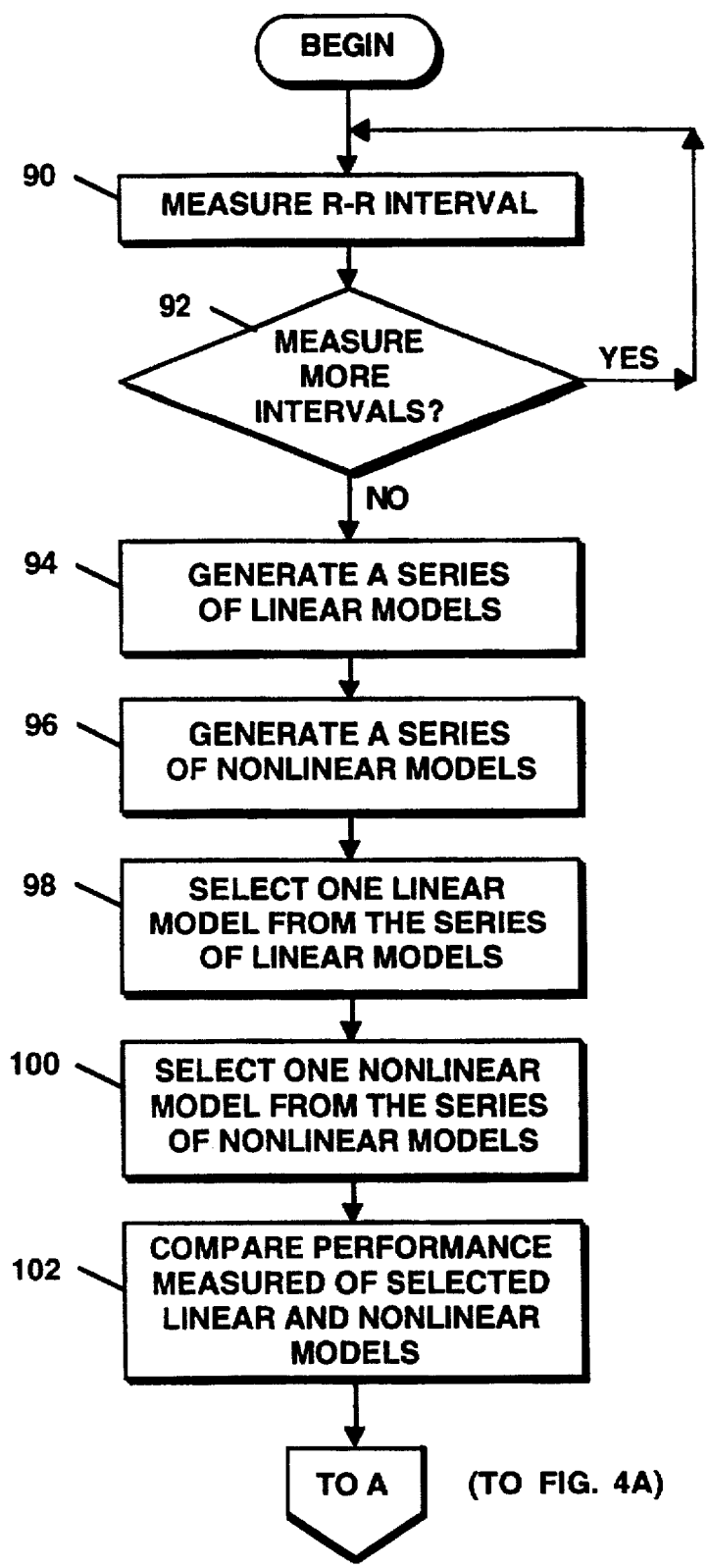
FIGS. 4–4B are a series of flow diagrams of the processing performed by the biological diagnostic system of FIG. 3.

Referring to FIG. 4, the steps related to analyzing R—R intervals in cardiac patients to identify the existence of nonlinearity in the R—R intervals are described. Steps 90 and 92 form a loop in which a plurality of R—R intervals are measured. Thus a series of R—R intervals typically in the range of about 100 to 50,000 intervals are measured. It should be noted that in a preferred embodiment between 500 and 2500 R—R intervals are measured. Those of ordinary skill in the art will appreciate of course that in some applications it may be desirable to measure more than 2500 intervals or fewer than 100 intervals or to segment the data into suitable intervals for relatively long data sets.

Figure 4A:
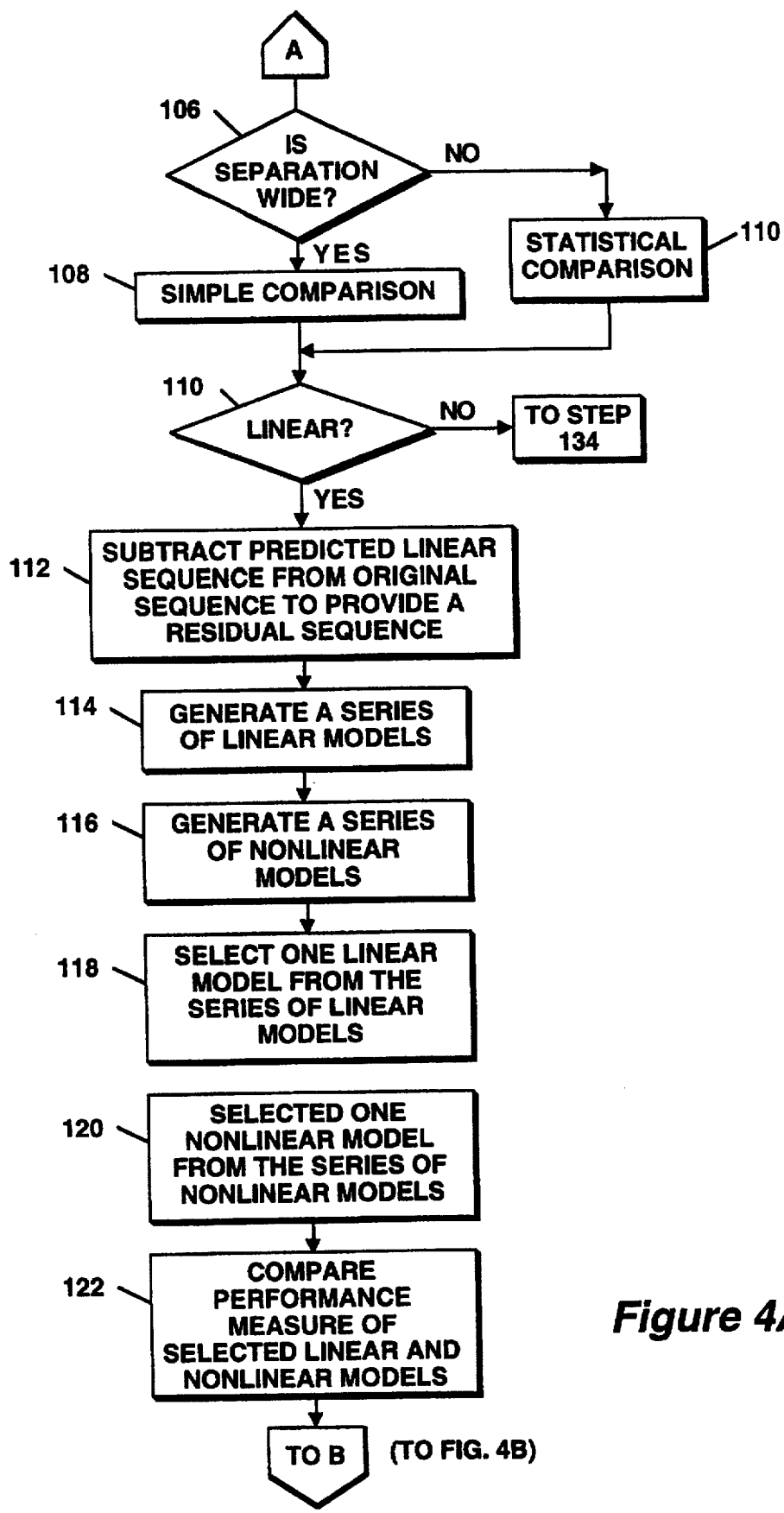
FIG. 4C is a plot of a sequence of R—R intervals.
FIG. 4D is a graph which shows the percentage of subsections of R—R intervals having linear and nonlinear components in healthy patients.
FIG. 4E is a graph of the percentage of R—R intervals having linear and nonlinear components for cardiac heart failure patients.
Figure 4B:
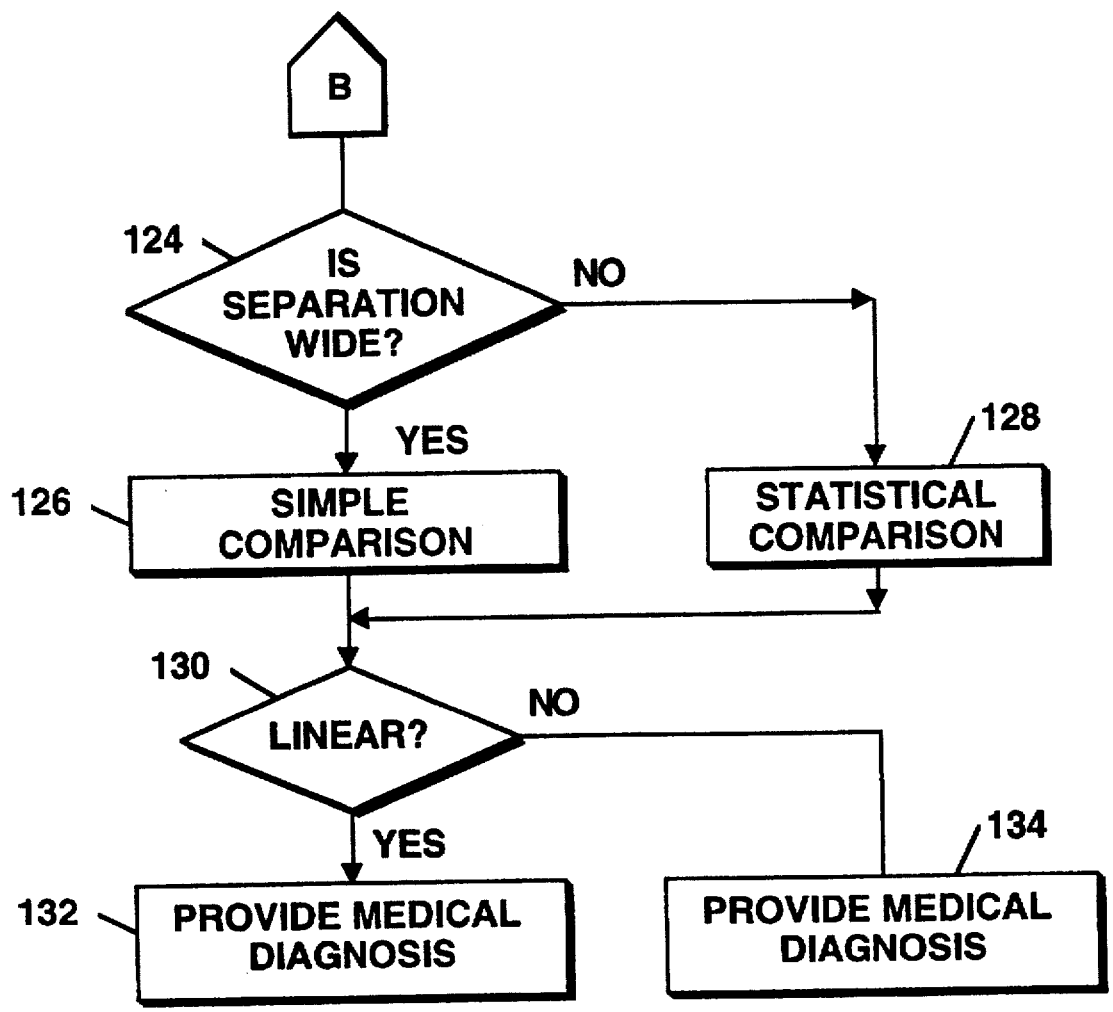
Figure 4C:
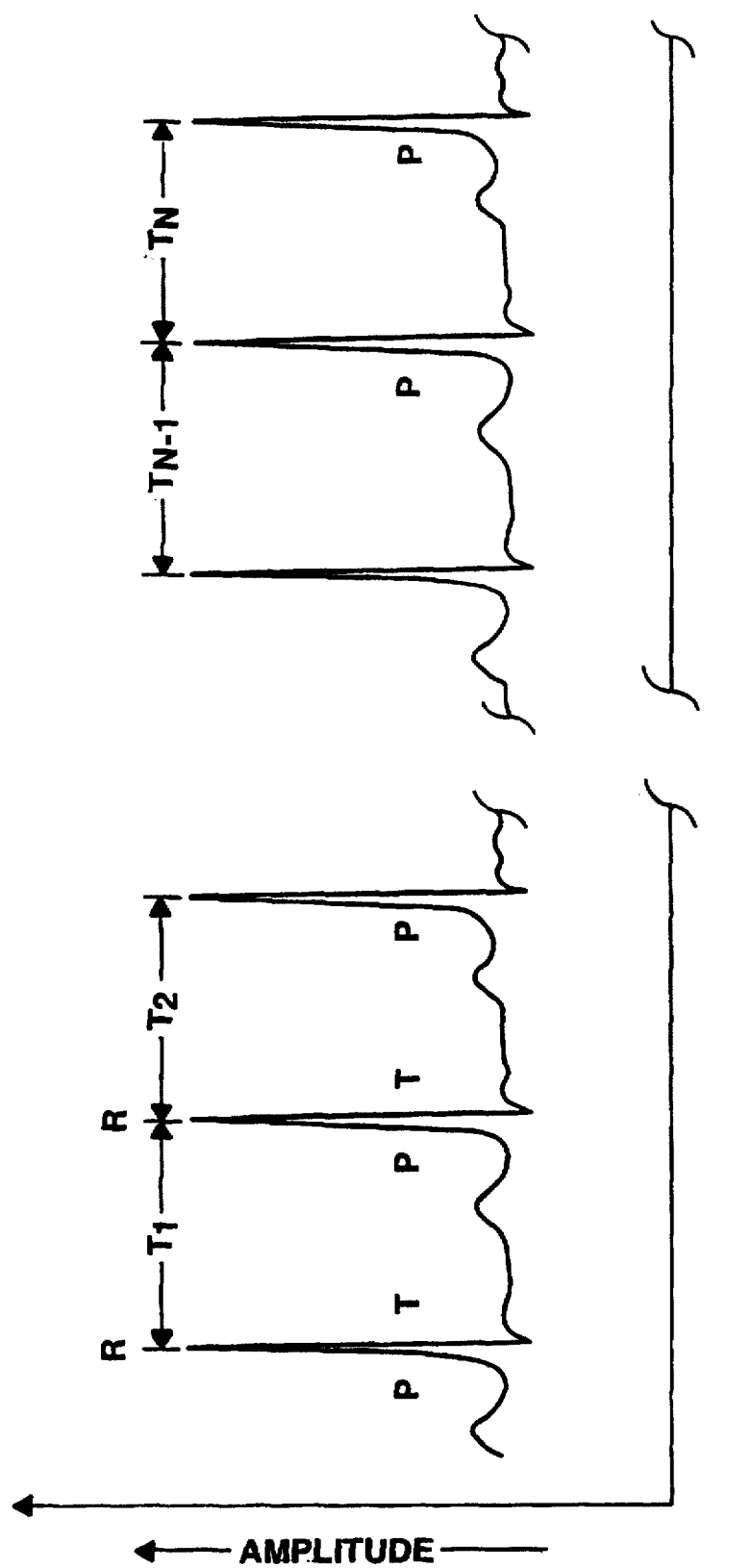

Referring briefly to FIG. 4C, a healthy heart beat is shown with a particular heart rate (BPM or beats per minute) with a standard deviation. Typically, variations in heart rate do not express a failure condition solely through statistical analysis.

The present method and apparatus contemplate location of the peak in the heart rate signal obtained by appropriately attaching to a patient, electrodes which provide an output of the heart beat signal. In a preferred embodiment of the present invention, the heart signal is sampled and digitized to thereby convert from analog to digital values. The sampling rate is typically in the range of about 128 to 512 samples per second with 300 being preferred. It should be noted, however, that collection of large amounts of data may lead to the need to store and process such data. Nevertheless an increase in the data sampling rate may lead to an increase in precision in the modeling of the data set. The sampling rate can be carried to a desired level of precision. In any event, sampling and digitizing is carried out typically at that rate. For purposes of digitizing, an analog to digital converter (ADC) makes measurements by means of a 12 or 14 bit digitizer. This level of accuracy or precision can be varied to obtain the precision desired. A sign bit is normally included with this data.

From beat to beat, the same part of the signal is located. This is preferably the peak which is normally termed the R complex, and as noted before, location of such peaks in a series of heart beats in effect measures the time interval from one beat to the next or the R—R interval. Other parts of the signal waveform can be detected, but it is generally easier to locate the R complex. As a generalization, the heart beat length evidences a certain degree of randomness which is indicative of a healthy heart, or one that is not subject to lethal cardiac arrest. More particularly, there is a measure of randomness that can be described as a specified range which is indicative of a healthy heart while in contrast a prearrest condition does exist where there is a conspicuous absence of randomness.

Referring again to FIG. 4A, once a predetermined number of R—R intervals have been measured to thus provide a data sequence, processing proceeds to steps 94, 96 where a series of linear models and nonlinear models are obtained for the R—R data sequence. The linear and nonlinear models may be provided as a closed-looped version of the Volterra-Wiener-Korenberg series discussed above in conjunction with FIG. 1, in which an output value $y_n$ loops back as a delayed input (i.e. $x_n = y_{n-1}$)

Next, as shown in step 98, a particular linear model is selected from the series of linear models generated in step 94. To select the linear model, a performance measure of each of the linear models is selected and computed. The performance measure of each of the linear models are compared to each other. The particular linear model which is selected is the linear model having a preferred performance measure. It should be noted that in some applications the preferred performance measure may not correspond to an optimum or best performance measure. The selected linear model has a preferred performance measure.

Similarly, as shown in step 100, a particular one of the nonlinear models is selected from the series of nonlinear models generated in step 96. To select the particular nonlinear model, a performance measure of the model is identified and this performance measure is computed for each of the nonlinear models in the series of nonlinear models. The computed performance measures are compared and the nonlinear model having a preferred performance measure is selected. It should be noted that in some applications, the preferred performance measure may not correspond to an optimum or best performance measure.

In this particular embodiment, the performance measure is selected to be the Akaike Information Criteria (AIC). It should be noted that any one of a plurality of performance measures including but not limited to the AIC performance measure, a minimum description length measure, a log likelihood measure and a residual sum of square errors performance measures may also be used. The selection of a particular performance measure depends upon a variety of factors including but not limited to the amount and type of noise in the signal, the degree of nonlinearity and memory length of the system, and the length and discretization level of the data set.

The performance measures of the selected linear and nonlinear models having the preferred performance measures are then compared as shown in step 102. Next, as shown in decision block 106, a decision is made as to whether the separation between the performance measures of the selected linear and nonlinear models is relatively wide.

If the performance measure values are substantially different, processing continues to step 108 where a relatively simple comparison technique is used to compare the values. If on the other hand, the performance measure values are similar, processing continues to step 110 where a statistical comparison is performed between the preferred AIC value of the linear model and the preferred AIC value of the nonlinear model.

Once the preferred AIC values are identified and compared, processing continues to decision block 110 where decision is made as to whether the system is linear. That is, if the AIC value of the nonlinear model is less than the AIC value of the linear model, then this indicates that the nonlinear model represents the system from which the data set is taken better than the linear model and processing ends.

If on the other hand, the AIC value of the linear model is lower than the AIC value of the nonlinear model, then this indicates that the linear model represents the system from which the data set is taken better than the nonlinear model and processing continues to processing step 112 where a linear sequence predicted by the linear model is subtracted from the original sequence to produce a residual sequence. Then as shown in steps 114–128, linear and nonlinear models are generated, performance measures are computed and compared and processing flows to decision block 130 where a decision is then made as to whether the residual sequence is linear or not.

If the residual sequence is best represented as a linear model, than the system is identified as a non-chaotic system and a diagnosis as shown in step 132 is provided. If on the other hand the residual sequence is most accurately represented as a non linear model then the system is identified as a chaotic system and a diagnosis as shown in step 134 is provided.

Referring now to FIG. 4C, in this case, interbeat interval sequences were chosen as the output variable. As described above, an interbeat interval is the length of time between two beats. Interbeat intervals provide a natural discretization of the system. Each interbeat interval deeper into the past from the current beat provides a unit of memory for the algorithm. By choosing the interbeat interval as the discrete unit of the series to be analyzed, it is not necessary to interpolate between signal portions which could introduce artificial fractional memory terms into the sequence and require a large polynomial memory than is actually best for approximating the system.

Thus, in the case where biological system 73 (FIG. 3) corresponds to a human heart the present invention applies an analysis to the R—R interval measurements. Thus, these measurements are analyzed to locate a subtle representation of the randomness which is present in the data. This has several benefits. The technique of the present invention provides a useful indicator with a smaller set of data. By contrast, conventional techniques require perhaps 5,000–50,000 or more heart beats. The present invention, however requires as few as only 500 heart beats, and it is thought to be possible to make this analysis wherein N is in the range of about 2500 or less, the lower limit not yet being determined. Moreover, the technique of the present invention provides an analysis relatively rapidly. Furthermore, the technique of the present invention may provide an indication for an individual as opposed to merely grouping the individual in broad categories (i.e., healthy versus unhealthy). The output of the present technique may provide a specific indication of vulnerability to lethal myocardial infarction (MI), sudden death or other cardiovascular abnormalities.

For example, a healthy heart may be indicated by a predetermined amount of chaotic activity while an unhealthy heart is indicated by a lack of chaotic activity. In very general terms, nonlinear analysis, as described herein, does not require stationarity of the biological generator (i.e., the human nervous system operating the heart in timed fashion) and relies on the lack of stationarities and makes measurements which are then used to determine whether a chaotic pattern exists This involves processing the data sequences as described above in conjunction with FIGS. 4–4B. One of the benefits of the present technique is that the total amount of data required is relatively small compared with the amount of data required to identify nonlinearities using conventional techniques.

Another advantage of the present invention is that the data which is obtained by the system can be analyzed almost in real time. It can operate readily with a patient whose heart rate is in the range of 30–130 beats per minute (BPM) and thereby provide analysis of this data at rates depending upon the speed of the computer used. For example, a personal computer having adequate memory can perform the requisite operations in substantially real time. This can be accomplished using a conventional set of electrodes installed in a conventional pattern for measuring the heart beat and feeding the collected data directly to the personal computer.

Figure 4D:
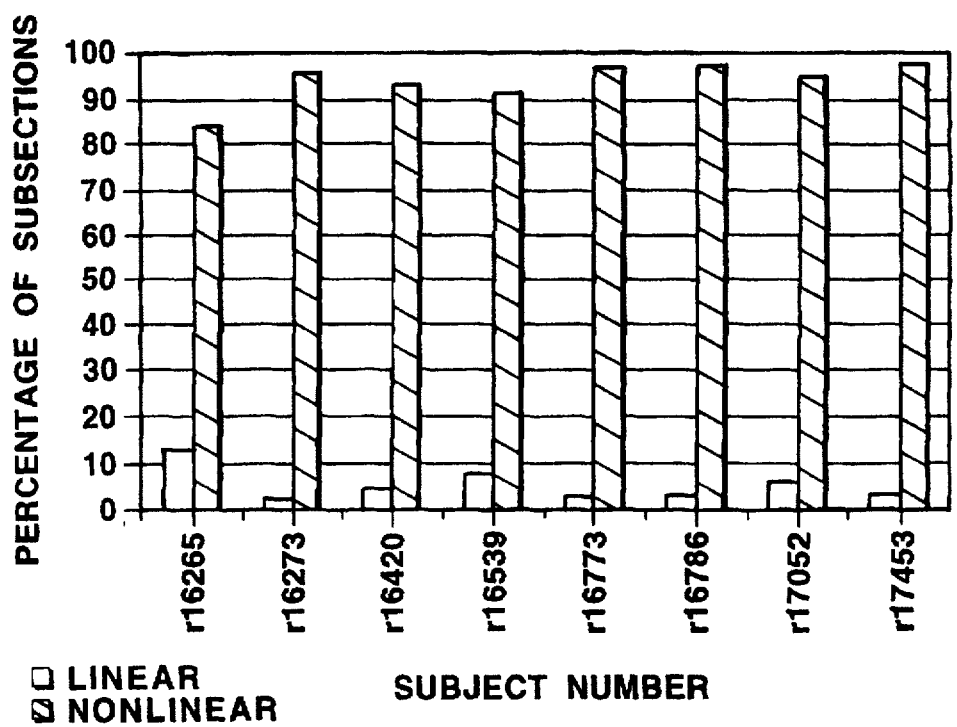
Figure 4E:
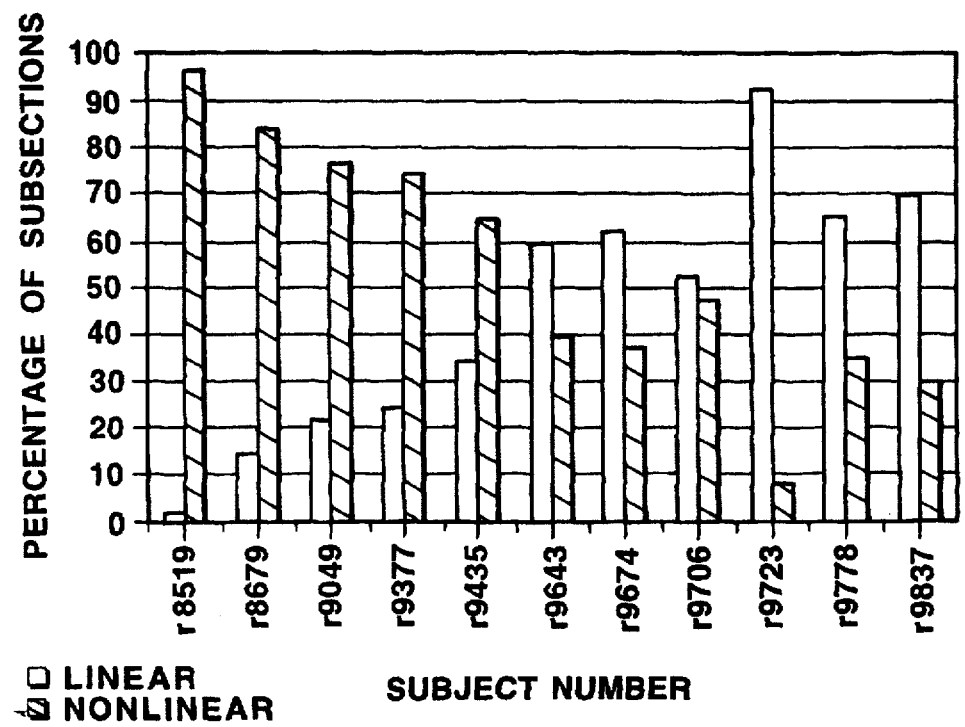

Referring now to FIGS. 4D and 4E, a pair of bar graphs representing the results of a Volterra Wiener analysis in accordance with the present invention of a series of interbeat intervals (an RR series) of healthy subjects FIG. 4D and congestive heart failure (CHF) patients FIG. 4E are shown. The graphs represent the histograms of the number of 500-point sections that are best fit by a linear or nonlinear Volterra model in each subject. It should be noted that the majority of the R—R series of healthy subjects are nonlinear whereas those of CHF patients frequently degenerate to linearity.

As mentioned above, it should also be noted that, when dealing with continuous signals, the time delay T for the embedding (or optimal sampling rate) is another free parameter to be determined. For detection purposes, an optimal time delay $T_{opt}$ may be selected to maximize the difference between the one step ahead prediction error for the nonlinear model using the original data set $\epsilon_{orig}^{lin}$ and the one step ahead prediction error for the nonlinear model using the original data set $\epsilon_{orig}^{nl}$. Thus, referring now to FIG. 5, a method of selecting a sample interval is shown to include step 136 where an initial sample interval is selected. It is preferable to select the initial sample interval to be the smallest available sample interval. Processing the continues to step 138 where linear and nonlinear models are generated and compared using the techniques discussed above in conjunction with FIGS. 1, 2 and 4.

Processing then flows to decision block 140 where a decision is made as to whether the data set contains a nonlinear component. If the data set does not contain a nonlinear component then processing continues to step 142 where a new interval is selected and a new set of linear and nonlinear models are generated. If in decision block 140 a decision is made that a nonlinear component exists then processing ends.

The value of $T_{opt}$ is bounded by two limits. On one hand, if $T>>T_{opt}$ (under sampling) all four models (linear and nonlinear, original or surrogate) will have similarly small prediction powers and nonlinearity cannot be detected. On the other hand, for an over sampled data series with a small step size ($T<<T_{opt}$), the linear correlation of the embedding is so large that linear models always prevail. Within the range of acceptable time delays where $T_{opt}$ lies, generally the standard deviation of the linear models for both the original and surrogate data sets are approximately equal i.e. $\epsilon_{orig}^{lin} \approx \epsilon_{surr}^{lin}$. That is, when optimally sampled, the prediction power of the linear model of a continuous signal derives mainly from its autocorrelation function.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

We claim:

1. An apparatus for analyzing an electrocardiograph signal to determine whether the electrocardiograph signal includes a nonlinear signal component the apparatus comprising:

(a) a modeling system comprising:
a modeling processor for receiving the electrocardiograph signal and for representing at least a portion of the electrocardiograph signal with a first linear model having a first set of parameters and a first set of coefficients and for representing at least a portion of the electrocardiograph signal with a second model corresponding to a first nonlinear model having a second set of parameters and a second set of coefficients; and
a performance processor for computing a first performance measure of the first model and for computing a second performance measure of the second model; and (b) a performance measurement system coupled to said modeling system said performance measurement system comprising:
a comparison processor for receiving the first and second performance measures and for comparing the first performance measure to the second performance measure; and
a selection processor for receiving an indication from said comparison processor and for identifying which of the first and second performance measures is a preferred performance measure and for providing an output signal indicating whether the electrocardiograph signal includes a nonlinear signal component.

2. The apparatus of claim 1 wherein said performance measurement system further comprises:
a residual sequence generator having an input port coupled to receive a sequence of values generated from a linear model and having an output port, the residual sequence generator for providing a residual data sequence at the output port thereof; and
a residual modeling system having an input port coupled to the output port of said residual sequence generator and having an output port, the residual modeling system for generating a linear model and a nonlinear model of the residual data sequence fed received at the input port thereof and for comparing the nonlinear model to the linear model.

3. The apparatus of claim 1 wherein said modeling system further comprises at least one sensor having an input port and having an output port coupled to provide data to said modeling processor.

4. The apparatus of claim 1 wherein said modeling system further comprises a data storage device coupled to said modeling processor and having the electrocardiograph signal stored therein.

5. A method for detecting a nonlinear pattern in a bio-signal, the method comprising the steps of:
representing at least a portion of the bio-signal with a linear model having a first set of parameters;
representing at least a portion of the bio signal with a nonlinear model, the first nonlinear model having a second set of parameters;
computing a first performance measure of the first model;
computing a second performance measure of the second model;
comparing the first performance measure to the second performance measure;
identifying which of the first and second performance measures is a preferred performance measure; and
providing an output signal indicating whether the bio-signal includes a nonlinear signal component.

6. The method of claim 5 further comprising the steps of:
selecting a first one of the first and second models having the preferred performance measure to represent the bio-signal.

7. The method of claim 6 wherein the comparing step includes the step of:
determining a difference value between the first performance measure and the second performance measure;
comparing the difference value to a predetermined threshold difference value;
in response to the difference value being equal to or greater than the threshold difference value, identifying a respective one of the performance measures as the preferred performance measure.

8. The method of claim 6 further comprising the steps of:
generating a surrogate data set;
representing the surrogate data set with a second linear model having a third set of parameters and a third set of coefficients;
representing the surrogate data set with a second nonlinear model having a fourth set of parameters and a fourth set of coefficients;
comparing a performance measure of the second linear model to a performance measure of the second nonlinear model
identifying which of the performance measures is a preferred performance measure;
selecting a first one of the second linear model and second nonlinear model having the preferred performance measure; and
comparing the first one of the second linear model and second nonlinear model to the first one of the linear model and nonlinear model.

9. The method of claim 8 wherein the performance measure corresponds to a first one of:
an Akiake information criteria;
a minimum description length;
a log likelihood measure; and
a residual sum of the square error.

10. The method of claim 6 wherein:
the first set of parameters and first set of coefficients of the linear model correspond to parameters and coefficients which provide an optimum linear model; and
the second set of parameters and second set of coefficients of the nonlinear model correspond to parameters and coefficients which provide an optimum nonlinear model.

11. The method of claim 10 wherein the steps of representing the bio-signal with a nonlinear model and a nonlinear model includes the step of generating linear and nonlinear models corresponding to Volterra-Wiener models.

12. The method of claim 11 wherein the step of comparing the performance measure of the linear model to the performance measure of the nonlinear model comprises the step of statistically comparing a first value of the performance measure of the linear model to a first value of the performance measure of the nonlinear model.

13. A method for detecting nonlinearity in a data set generated by a biological system, the method comprising the steps of:

representing the data set with a linear model having a first set of parameters and a first set of coefficients;

representing the data set with a non-linear model having a first set of parameters and a first set of coefficients;

computing a performance measure of the linear model;

computing a performance measure of the nonlinear model;

comparing the performance measure of the linear model to the performance measure of the nonlinear model;

identifying which of the performance measures of the linear model and the nonlinear model is a preferred performance measure;

selecting a first one of the linear and nonlinear models having the preferred performance measure; and providing an output signal indicating whether the data set generated by the biological system includes a nonlinear signal component.

14. The method of claim 13 wherein the step of comparing the performance measure of the linear model to the performance measure of the nonlinear model includes the step of statistically comparing the performance measure of the linear model to the performance measure of the nonlinear model.

15. The method of claim 14 wherein the linear model and nonlinear model are not the optimum models.

16. The method of claim 14 wherein:

the linear model corresponds to an optimum linear model; and the nonlinear model correspond to an optimum nonlinear model.

17. A method for analyzing a hemodynamic signal to determine the presence of a chaotic signal component within the hemodynamic signal, the method comprising the steps of:

dividing the hemodynamic signal into a plurality of time segments, each of the plurality of time segments having a discrete value;

representing each of the plurality of time segments of the hemodynamic signal with a first model corresponding to a first linear model;

representing each of the plurality of time segments of the hemodynamic signal with a second model corresponding to a first non-linear model;

computing a performance measure of the first lineary model, computing a performance measure of the first non-linear model; and comparing the performance measure of the first model to the performance measure of the second model.

18. The method of claim 17 further comprising the steps of:

identifying which of the first and second performance measures is a preferred performance measure; and selecting a first one of the first and second models having the preferred performance measure.

19. The method of claim 18 wherein:

the hemodynamic signal corresponds to an electrocardiograph signal; and the time segments correspond to RR intervals of the electrocardiograph signal.

20. The method of claim 17 wherein the step of comparing the performance measure of the first model to the performance measure of the second model includes the step of statistically comparing the performance measure of the first model to the performance measure of the second model.

21. A method for analyzing an electrocardiograph signal to detect the presence of a chaotic signal component in the electrocardiograph signal, the method comprising the steps of:

generating a linear model to represent a first sequence of data values corresponding to measured RR intervals of the electrocardiograph signal, the linear model having a first predetermined number of terms; and generating a non-linear model to represent the first sequence of data values corresponding to the series of measured RR intervals of the electrocardiograph signal, the non-linear model having a second predetermined number of terms, computing a performance measure of the linear model;

computing a performance measure of the nonlinear model; and comparing the performance measure of the linear model to the performance measure of the nonlinear model.

22. The method of claim 21 further comprising the steps of:

identifying one of the performance measure of the linear model and the performance measure of the nonlinear model as a preferred performance measure; in response to the preferred performance measure corresponding to the performance measure of the linear model performing the steps of:

generating a predicted sequence of data values using the linear model;

subtracting the predicted linear sequence of data values from the first sequence of data values to generate a residual sequence of data values;

generating a linear model to represent the residual sequence of data values; generating a nonlinear model to represent the residual sequence of data values;

computing a performance measure of the linear model which represents the residual sequence of data values;

computing a performance measure of the nonlinear model which represents the residual sequence of data values; and comparing the performance measure of the linear model which represents the residual sequence of data values to the performance measure of the nonlinear model which represents the residual sequence of data values.

23. The method of claim 22 further comprising the step of identifying one of the performance measures of the linear and nonlinear models which represent the residual sequence of data values having a preferred value.

24. The method of claim 23 further comprising the steps of:

providing a first medical diagnosis in response to the performance measure of the linear model which represents the residual sequence of data values having the preferred value; and providing a second medical diagnosis in response to the performance measure of the nonlinear model which represents the residual sequence of data values having the preferred value.

25. A method for selecting samples from a continuous parameter signal, the method comprising the steps of:

(a) dividing the continuous parameter signal into a first plurality of discrete time intervals each of the discrete time intervals including a plurality of discrete data points;

(b) selecting a first plurality of discrete data points from predetermined ones of the first plurality of discrete time intervals, each of the first plurality of discrete data points spaced by a first predetermined time interval;

(c) representing the continuous parameter signal using the first plurality of discrete data points with a linear model;

(d) representing the continuous parameter signal using the first plurality of discrete data points with a nonlinear model;

(e) determining how well the linear model represents the continuous parameter signal by computing a performance measure of the linear model;

(f) determining how well the nonlinear model represents the continuous parameter signal by computing a performance measure of the non-linear model;

(g) comparing the performance measure of the linear model to the performance measure of the non-linear model; and (h) in response to the performance measure of the linear model being preferred over the performance measure of the nonlinear model, then performing the steps of:

(1) selecting a next plurality of discrete data points from predetermined ones of the first plurality of discrete time intervals, each of the next plurality of discrete data points spaced by a next predetermined time interval; and (2) repeating steps (c)–(h) until a first one of the following conditions occurs:

(i) the performance measure of the non-linear sequence is preferred over the performance measure of the linear sequence; and (ii) a maximum time interval is reached.

26. The method of claim 25 further comprising the steps of:

selecting a sequence of data points used to represent the continuous parameter signal, each of the data points spaced by the time interval at which the performance measure of the non-linear sequence is preferred over the performance measure of the linear sequence.

* * * * *

UNITED STATES PATENT AND TRADEMARK OFFICE
CERTIFICATE OF CORRECTION

PATENT NO. : 5,792,062
DATED : August 11, 1998
INVENTOR(S) : Poon et al.

It is certified that error appears in the above-identified patent and that said Letters Patent is hereby corrected as shown below:

| Column | Line(s) | | Should read |
|---|---|---|---|
| Cover | Title | METHOD AND APPARATUS FOR DETECTING NONLINEARITY IN AN ELECTROCARDIOGRAPHIC SIGNAL | METHOD AND APPARATUS FOR DETECTING NONLINEARITY IN A DYNAMICAL SYSTEM |
| 1 | Title | METHOD AND APPARATUS FOR DETECTING NONLINEARITY IN AN ELECTROCARDIOGRAPHIC SIGNAL | METHOD AND APPARATUS FOR DETECTING NONLINEARITY IN A DYNAMICAL SYSTEM |

UNITED STATES PATENT AND TRADEMARK OFFICE
CERTIFICATE OF CORRECTION

PATENT NO. : 5,792,062
DATED : August 11, 1998
INVENTOR(S) : Poon et al.

It is certified that error appears in the above-identified patent and that said Letters Patent is hereby corrected as shown below:

| Column | Line(s) | | Should read |
|--------|---------|--|-------------|
| 17 | 21 | system said | system, said |
| 19 | 15 | measure: and | measure; and |

Signed and Sealed this

Fourth Day of May, 1999

*Attest:*

Q. TODD DICKINSON

*Attesting Officer*    Acting Commissioner of Patents and Trademarks